United States Patent [19]

Fincher et al.

[11] Patent Number: 4,872,073
[45] Date of Patent: Oct. 3, 1989

[54] APPARATUS FOR PLAYBACK OF MAGNETICALLY RECORDED DATA HAVING A VARIABLE INPUT RATE

[75] Inventors: Jeffrey L. Fincher, San Bruno; Michael R. Stephens, Fremont, both of Calif.

[73] Assignee: Ampex Corporation, Redwood City, Calif.

[21] Appl. No.: 240,865

[22] Filed: Sep. 2, 1988

[51] Int. Cl.$^4$ .............................................. G11B 5/09
[52] U.S. Cl. ..................................... 360/51; 370/101; 370/84
[58] Field of Search .................... 360/51; 370/101, 84; 375/111

[56] References Cited

U.S. PATENT DOCUMENTS

| | | | |
|---|---|---|---|
| 3,944,940 | 3/1976 | Desai | 329/122 |
| 4,180,701 | 12/1979 | Louth et al. | 178/69.1 |
| 4,191,976 | 3/1980 | Brown | 360/51 |
| 4,231,071 | 10/1980 | Anderson | 360/51 |
| 4,321,483 | 3/1923 | Dugan | 307/269 |
| 4,330,846 | 5/1982 | Colles et al. | 364/900 |
| 4,561,083 | 12/1985 | Nishikawa et al. | 360/51 |
| 4,607,298 | 8/1986 | Smidth | 360/51 |
| 4,613,913 | 9/1986 | Phillips | 360/51 |
| 4,644,420 | 2/1987 | Buchan | 360/51 |
| 4,752,837 | 6/1988 | Deland, Jr. | 360/51 |
| 4,780,772 | 10/1988 | Shibaya et al. | 360/51 |

OTHER PUBLICATIONS

IBM Technical Disclosure Bulletin/vol. 28 No. 5(10/85).

Primary Examiner—Vincent P. Canney
Assistant Examiner—Kevin J. Fournier
Attorney, Agent, or Firm—Elizabeth E. Strnad; Richard P. Lange

[57] ABSTRACT

Data is received at a variable input rate and recorded on a longitudinal medium in the form of fixed length data blocks with variable length spacing between the blocks, utilizing a transducer mounted on a rotating scanner drum. The input data rate may change between various recording/playback operations by a ratio of 1:100 or more, but during a particular operation it remains constant. The data blocks played back from the medium are sequentially stored in a memory at the internal data transfer clock rate, which is also utilized to control the scanner rotation. The data is read from the memory at a constant rate which is adjusted for each particular operation. A memory status control signal is provided indicating a predetermined level of fullness obtained by the memory. That control signal is compared in time to a control signal indicating occurrence of the beginning of a next data block. When these two control signals coincide, the average amounts of data entering the memory and being read from the memory are equal. When these average amounts differ, an error signal is generated, corresponding to the time difference between the two control signals. The control signal is applied to adjust the internal data transfer clock rate, and thereby also the scanner rotation to compensate for the time difference.

9 Claims, 9 Drawing Sheets

APPARATUS FOR PLAYBACK OF MAGNETICALLY RECORDED DATA HAVING A VARIABLE INPUT RATE

The invention described herein was made in the course of Contract No. 9R90-048360 awarded by the U.S. Government.

The invention relates to an apparatus for playback of data received at a variable input data rate, which data has been recorded on a longitudinal recording medium, for example magnetic tape, in the form of fixed length data blocks, utilizing a transducer mounted on a rotating scanner drum. More specifically, the apparatus of the invention is suitable for playback of data whose input rate prior to recording may change from one recording/playback operation to another by a ratio of 100:1 or more, while the longitudinal speed of the medium or the rotational speed of the scanner do not change as a function of the input data rate.

BACKGROUND OF THE INVENTION

One type of known rotating head magnetic tape recording/reproducing device for recording and reproduction of data, whose input rate varies between recording sessions, utilizes incremental tape motion. In this type of device the input data to be recorded is stored in a record buffer. When the buffer reaches a predetermined fill level, the tape transport is started, and the contents of the buffer are recorded on tape at a selected constant rate. When the buffer is almost empty, the tape is stopped until the buffer reaches the predetermined fill level. During playback, this process is reversed in that the off-tape data played back at a constant speed is stored in a playback buffer and read therefrom at the original input rate. When that buffer reaches the fill level the tape is stopped, and it is activated again when the playback buffer is almost empty.

Another type of device varies the rotational speed of the tape capstan as a function of the input data rate, thereby varying the longitudinal (also referred to as linear) tape speed. When this method is utilized in helical tape recorders, where the tape is accelerated or slowed down, depending on the input data rate, the dynamic helix angle also changes as the function of the linear tape speed. To maintain the transducer over the center of the signal track on the tape during these changes, it is necessary to utilize automatic scan tracking. Consequently, both above indicated systems require complex mechanical and electrical control devices.

SUMMARY OF THE INVENTION

The present invention provides a simplified apparatus for playback of data, capable of accommodating variations of the input data rate in the range of 1:100 or more, between subsequent record/playback operations, while both the nominal longitudinal speed of the medium and scanner speed do not change as a function of the variable input data rate.

The input data is received as a data stream and recorded in the form of fixed length data blocks. To accommodate the variations in the input data rate, variable length spaces are provided between the recorded data blocks. In the preferred embodiment these spaces are filled by bit stuffing prior to recording, in a well known manner. The input data rate and thus also the spacing between the recorded data blocks remain constant during each particular recording operation. A beginning of data block (BOD) marker is attached to the beginning of each block for data detection and synchronization purposes, as is well known in the art. The rate at which the input data is received is measured and recorded along with the data on the medium in a well known manner.

In the preferred embodiment of the invention an encoded, magnetically recorded signal is reproduced from a magnetic tape by a rotary scan playback transducer. The reproduced signal is amplified, filtered, decoded, and is submitted to time-base error correction, as well as to data error correction, utilizing well known playback techniques. A playback synchronizing (sync) generator provides an internal clock for controlling the rae of data transfer within the apparatus, and synchronously therewith the speed of rotation of the scanner drum during playback. When the beginning of each data block is detected, the data from the following data block is stored in a data output memory. The memory outputs the playback data sequentially at a stable, fixed output clock rate, which is determined by playing back the recorded input data rate. To assure a constant output data flow from the memory at the above-indicated fixed rate, while also assuring that the memory will not overflow or become empty, the apparatus of the invention operates as follows.

In accordance with the invention, the playback data is written into the output memory at the data transfer rate. The memory outputs the stored data sequentially at the data output clock rate. The memory provides a status signal indicating a predetermined level of fullness thereof.

The memory write control circuit detects a difference in time between the occurrence of a beginning of data (BOD) control signal and the memory status control signal, and it provides a corresponding error signal. When the average rate at which data is written into the memory is equal to the average data readout rate, the BOD and the memory status signals coincide and the error signal is equal to zero. When the BOD signal occurs before the memory status signal, it indicates that the data is beginning transfer at a faster than optimum rate, and the memory will eventually overflow. On the other hand, if the memory status signal occurs before the BOD signal, the playback data is being transferred at a slower than optimum rate, and the memory will eventually become empty. The error signal is applied to the playback sync generator, which in turn adjusts the frequency of the data transfer rate, and thereby also the rotational speed of the scanner, to compensate for the time difference.

In accordance with the preferred embodiment of the invention, the memory write control circuit attaches a middle of data (MOD) marker to a data byte which occurs in the middle of the data block, and that MOD marker is written in the memory together with that data byte. The memory provides the memory status signal when the MOD marker is read from the memory. Consequently, there is no need to actually count the number of data bits read from the memory, and thus an output data counter does not need to be used, whereby the apparatus of the invention is further simplified.

It is a significant advantage of the apparatus of the invention that the playback data memory is maintained on the average at a predetermined optimum level of fullness, which in the preferred embodiment a is a half-full status, and at the same time the playback data is read from the memory at a stable, fixed rate. The foregoing optimum level of fullness is obtained by slightly increasing or decreasing the rate at which the data is written into the memory, and synchronously therewith accelerating or decelerating the scanner speed during playback, depending on the polarity of the error signal, while the nominal tape speed and scanner speed do not change with the input data rate. As has been previously indicated, that rate may vary from one recording/playback operation to another by a ratio of 100:1 or more. It will be understood by those skilled in the art that the memory status signal, which indicates a predetermined level of fullness does not need to be provided at the middle of data block. Depending on a desired recording/playback application, or circuit implementation, the memory status signal may be provided to indicate any desired optimum level of fullness, such as $\frac{2}{3}$, $\frac{3}{4}$, etc.

While the preferred embodiment is described with reference to a rotary scan magnetic tape recording/reproducing device, it will be understood that the present invention may be also applied to devices utilizing other than the magnetic phenomena for recording and reproduction of an information signal on medium, for example optical devices.

DETAILED DESCRIPTION

Throughout the description and in all drawing figures like reference numerals are utilized to designate like circuit elements to facilitate comparison.

Figure 1:
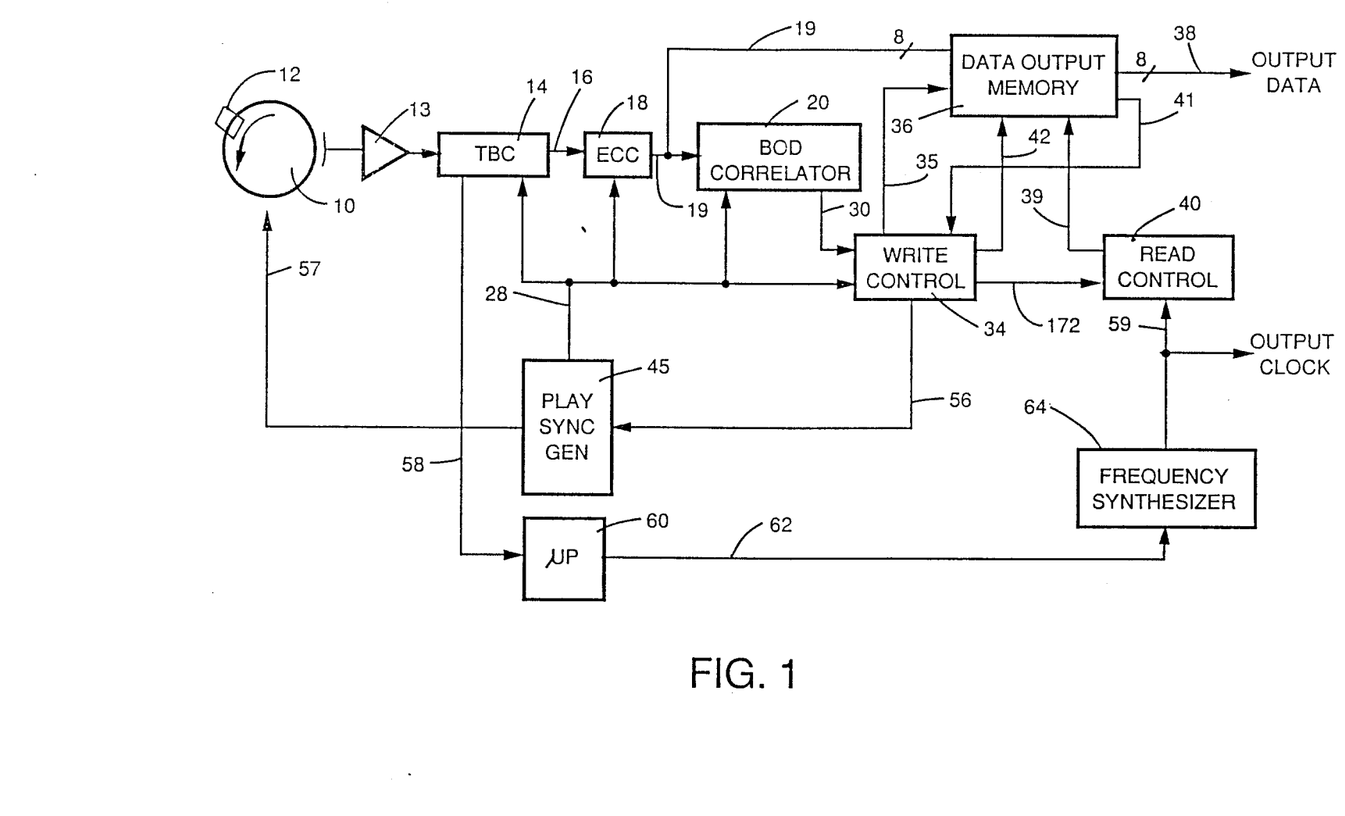
FIG. 1 is a simplified block diagram of the preferred embodiment of the invention.

FIG. 1 shows a simplified block diagram of the preferred embodiment of the invention, which will be described below. In the preferred embodiment a conventional helical scan playback device is utilized, having a rotating scanner drum 10, which may have mounted thereon one or more equally spaced rotating playback transducers, of which only one transducer 12 is shown for simplicity. The playback data from transducer 12 is received in the form of data blocks. The length of the data blocks is equal and fixed for all recording operations and independent of the input data rate. In the preferred embodiment each block contains 6 kilobytes of data. The input data rate prior to recording may vary in a range of 1:100 or more. However, during each particular recording operation the input data rate remains constant. With respect to the variable input data rate, at lower data rates, for example 1 MHz, the spacing between adjacent data blocks is relatively large comparing to high data rates, for example 100 MHz, when the blocks are spaced much closer together. To maintain synchronization of data during the recording and playback operation, preferably zero bits are inserted between consecutive data blocks prior to recording, utilizing well known bit stuffing techniques. The number of inserted bits depends on the actual rate at which the input data has been received. In accordance with the system of the invention, during a particular playback operation the output data rate remains constant and substantially corresponds to the original input data rate, so that the output data flow can be maintained uninterrupted, as it will follow from further description.

Prior to recording of data, a synchronozing word, further referred to as beginning of data (BOD) marker, is attached immediately preceding the beginning of each data block. There is also a marker at the end of each data block. In the preferred embodiment the BOD marker is 24 bytes long, where all the bits in a particular byte are of the same kind, that is, all ones or all zeroes.

With further reference to FIG. 1, the playback signal from the transducer 12 is applied to a playback amplifier 13, and the amplified signal therefrom to a time base correction (TBC) circuit 14. The time base corrected signal on line 16 is applied to an error correction circuit (ECC) 18. Because the circuits 13, 14 and 18 are of conventional design and well known in the art, a detailed description thereof will not be provided. The corrected signal on line 19 is applied in the form of parallel data bytes to a beginning of data (BOD) correlator 20. The correlator, which may be of a conventional design, operates as follows. It compares sequentially the consecutive bytes of data received on line 19 with the known 24-bit pattern of the BOD marker. The correlation is a sum corresponding to the number of matching data bytes with the BOD pattern. The thusly obtained sum is compared with a predetermined threshold number. When the sum is equal to or exceeds the threshold number, it is an indication that a valid BOD marker has been detected, and thus the beginning of a data block. Simultaneously with the detection, the BOD correlator 20 applies a control signal on line 30 to a memory write control circuit 34. In response to the control signal on line 30, the write control 34 applies via line 42 a series of write clock signals to a playback data output memory 36, whereby the following data block is sequentially written into the memory via line 19 at a write clock rate which is determined by the data transfer clock rate on line 28, as it will follow from further description. In addition, at the occurrence of the control signal on line 30 the memory write control 34 starts to count the number of data bytes written to the memory. When the count reaches 6000, indicating that a full data block has been written into the memory, the write control 34 stops generating write clocks.

In the preferred embodiment the memory 36 is implemented as a first-in, first-out (FIFO) type of memory. The memory write control 34 receives the internal data transfer clock on line 28, provided by a playback synchronizing (sync) system generator 45. In the preferred embodiment the clock on line 28 has a nominal frequency of 13.6 MHz. The previously indicated signal for controlling the rotational speed of the scanner 10 is derived from the internal clock as follows. That clock is divided by a frequency divider within the generator 45, which divider which in the preferred embodiment has a fixed dividing ratio of 1863. The resulting frequency divided signal on line 57 has a nominal frequency of 7300 Hz, and is applied on line 57 to a conventional servo circuit (not shown) for controlling the rotational speed of the scanner. Upon receiving the control signal on line 30 indicating presence of a BOD marker in the playback signal, the data is written into the memory 36 via line 19 at the write clock rate which is equal to the internal clock rate 13.6 MHz on line 28. In the preferred embodiment the FIFO memory 36 has a capacity of 12 kilobytes, and it is 9 bits wide. The data is written into the memory byte-wise via line 19, and it is being simultaneously and sequentially read out byte-wise on 8 parallel lines 38 at a constant read clock rate. Timing of the data output from the FIFO memory 36 is controlled via line 39 by a read control circuit 40, as it will be described below. To prevent overflow or underflow of the memory 36, while utilizing a constant data output clock rate, the average rate of data in and out of memory 36 must be the same. Consequently, the average amount of data written into the memory and read therefrom must be equal. Therefore, data from a following data block must be clocked into the memory, while the previous data block is clocked out therefrom. In the preferred embodiment by the time half of a particular data block has been taken out from the memory 36, the next block must be present and ready to be entered therein.

In the embodiment of FIG. 1 the memory 36 is maintained on the average at a half full level as follows. It is noted that in the preferred embodiment by "half-full" level an average amount of 3000 bytes of data in the memory is understood. That amount corresponds to one half of the size of a data block, which in this example is equal to 6000 bytes. Simultaneously with providing the memory write clocks for the 3000-th byte of a data block, the write control 34 inserts a middle of data (MOD) marker as a control bit via line 35 into the memory 36, as the 9-th bit of that byte. The 3000-th byte is thereby flagged as the middle of the data block, when that byte is written in the memory. When that same byte is read out from the memory 36, it applies the previously described memory status signal in the form of the MOD status on line 41 to the write control 34. The write control 34 provides a time comparison between the respective occurrences of the BOD marker and MOD status signals. In an ideal situation, when the memory 36 is precisely at a half full level, both control signals on lines 30 and 41 coincide. However, when the MOD status occurs before the BOD marker, it indicates that the data on line 19 is received at a slower than optimum rate, with reference to the output data rate, and if the situation remains uncorrected, the memory 36 will be allowed to gradually become empty. Consequently, the output data flow on line 38 would be interrupted. In another situation when the BOD marker occurs before the MOD status, it indicates that the data on line 19 is received at a faster than optimum rate. In this case, when the BOD marker occurs on line 30, the memory did not yet output the first half of the previous data block when the following data block is ready to be written into the memory. When this situation is not corrected, the memory contents will gradually overflow and data will be lost. The system in accordance with the present invention responds to either situation by slightly increasing or decreasing the internal data transfer clock rate, and synchronously therewith the rotational speed of the scanner drum during playback, thereby accelerating or decelerating the rate of receiving the off-tape playback data on line 19. The foregoing is obtained by utilizing a self-adjusting phase locked loop in the playback synchronizing generator circuit 45. That playback loop increases or decreases the frequency of the internal system clock on line 28, and thereby also the frequency of the control signal on line 57, which is applied to the scanner servo (not shown) to control the rotational speed of the scanner 10. The phase locked loop circuit will be described in more detail with reference to FIG. 2.

Now the manner of providing the output clock signal on line 59 will be described. With further reference to FIG. 1, the previously mentioned input data rate, which has been measured, encoded and recorded on tape is played back and decoded in a conventional manner. That decoded data rate is applied by the TBC circuit on line 58 to a commercially available microprocessor 60, for example type Z80A, manufactured by Zilog Corporation. The microprocessor receives that signal and programs the frequency synthesizer 64 via line 62 to provide the previously described output clock signal on line 59, having a frequency equal to the original input data rate. As it is well known, the frequency synthesizer is a stable, programmable clock signal source. The frequency synthesizer utilized in the preferred embodiment is a commercial device, for example type VDS-1700-8, manufactured by Scitel Corporation. To assure that the rotational speed of the scanner is tightly controlled within limits which do not differ substantially from its nominal speed, the output clock rate on line 59 is programmed to be within 0.06 percent or less of the original input data rate.

The signal on line 59 is applied to the read control circuit 40, which in response thereto applies on line 39 a read clock signal to the memory 36, synchronously with the signal on line 59. Once the frequency of the clock signal on line 59 is determined for a particular playback operation, it is set and maintained constant and stable until the next playback operation, when a different frequency may be determined. In the preferred embodiment the frequency synthesizer may be programmed to vary the output clock rate within the previously described wide range of frequencies 1:100. It follows from the foregoing description that the data is clocked out from the memory 36 on line 38 at a rate determined by the read clock signal on line 39 in synchronism with the output clock rate on line 59. To start the data readout from memory 36, the write control 34 enables the read control circuit 40 via line 172 when a sufficient amount of valid data is present in the memory.

The playback sync generator 45 comprises a self-adjusting phase locked loop (PLL) for adjusting the internal data transfer clock on line 28, and thereby also the memory write clock on line 35, as well as the rotational speed of the scanner 10, in turn preventing the memory 36 from overflow or underflow. The PLL in accordance with the preferred embodiment of the invention is shown in FIG. 2 and will be now described.

Figure 2:
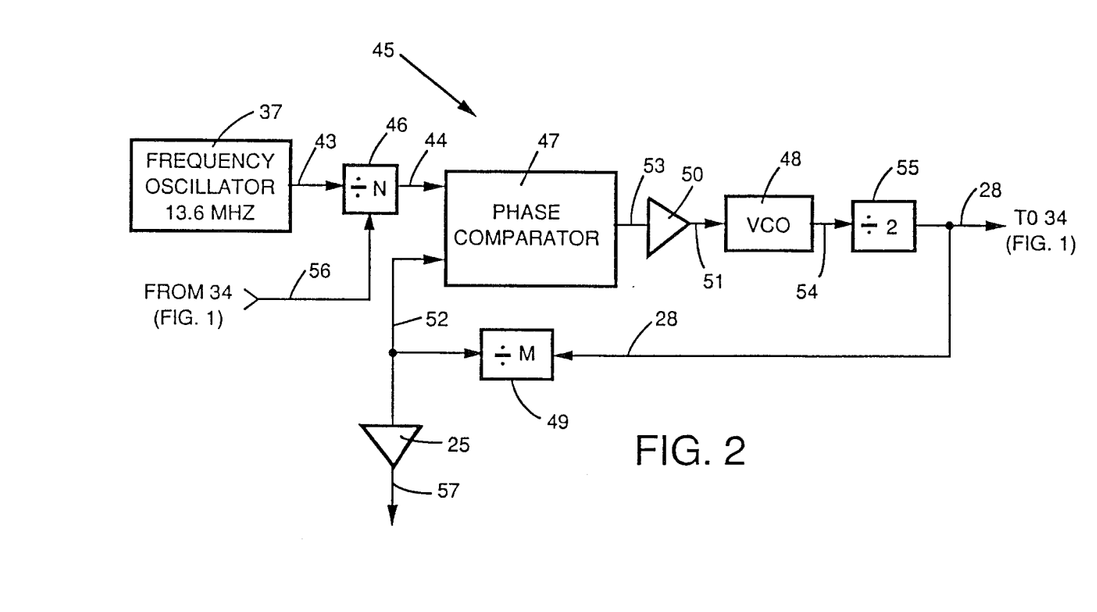
FIG. 2 is a block diagram of a phase locked loop utilized in the playback synchronizing generator circuit in accordance with the preferred embodiment.

As it has been previously indicated, and with further reference to FIG. 2, the playback sync generator 45 generates the internal data transfer clock on line 28 from which there is derived the scanner rotation control signal on line 57, synchronous therewith. The self-adjusting phase locked loop of FIG. 2 comprises a fixed frequency oscillator 37, which in the preferred embodiment generates a 13.6 MHz stable reference signal on line 43, corresponding to the nominal data transfer rate. The signal on line 43 is divided by a first frequency divider by N 46, which in the preferred embodiment is set to a nominal N=1863. The signal on line 44 from the divider 46 is applied to one input of a phase comparator 47. An output signal from the phase comparator 47 is applied via line 53 to an amplifier 50, and the amplified signal therefrom is applied on line 51 to control an output signal frequency from a voltage controlled oscillator (VCO) 48, applied on line 54. In the preferred embodiment the nominal output voltage frequency from VCO 48 is 27.2 MHz. That signal is further frequency divided by 2 in divider 55, and the resulting 13.6 MHz nominal frequency signal on line 28 is the previously described clock signal generated by the playback sync generator 45.

The signal on line 28 is also frequency divided by a second frequency divider by M 49. In the embodiment of FIG. 2 the dividing ratio is fixed and is M=1863. The thusly frequency divided signal on line 52 is applied to a second input of the phase comparator 47. The phase comparator compares the respective phases of the signals on lines 44 and 52, and the previously described output signal therefrom corresponds to the resulting phase difference, which in turn is applied to increase or decrease the output signal frequency from VCO 48 on line 54. The frequency divided signal on line 52 is buffered by a buffer 25 and the output signal there from on line 57 is applied to control the scanner rotation as it has been previously described with reference to FIG. 1.

In accordance with the invention, the dividing ratio N of divider 46 is adjustable by a control signal on line 56, applied from the write control 34 of FIG. 1, which signal corresponds to the time difference between the respective occurrences of the BOD marker and MOD status control signals on lines 30 and 41, respectively, as it has been described previously with reference to FIG. 1. Consequently, when the timing error signal on line 56 indicates that the MOD status signal occurred before the BOD signal, the signal on line 56 will decrease the dividing ratio N. As a result, the signal on line 53 from the phase comparator will slightly increase the output frequency of the VCO 48, and the internal transfer clock rate will increase, causing the scanner to accelerate, in turn increasing the rate of the data written into the memory 36 via line 19 of FIG. 1. In an opposite situation when the MOD status occurs after the BOD marker, the control signal on line 56 will increase N and the output signal frequency from VCO 48 will slightly decrease. Consequently, the internal data transfer clock rate will decrease, and the scanner rotation will decelerate, in turn resulting in a lower playback data rate on line 19 of FIG. 1. In the preferred embodiment the value of N changes only slightly by integers +1, −1, +2, or −2, that is between values 1861 and 1865, and only for a predetermined time period, to prevent abrupt changes in the data transfer rate in either direction.

A more detailed description of the preferred embodiment follow with reference to the schematic circuit diagram of FIGS. 3A to 3C, 4A to 4C, and 5, corresponding to portions of the above-described block diagram of FIG. 1. To provide a more complete disclosure, the integrated and other circuit components shown in the detailed diagram are designated by part numbers commonly used by manufacturers.

Figure 3A:
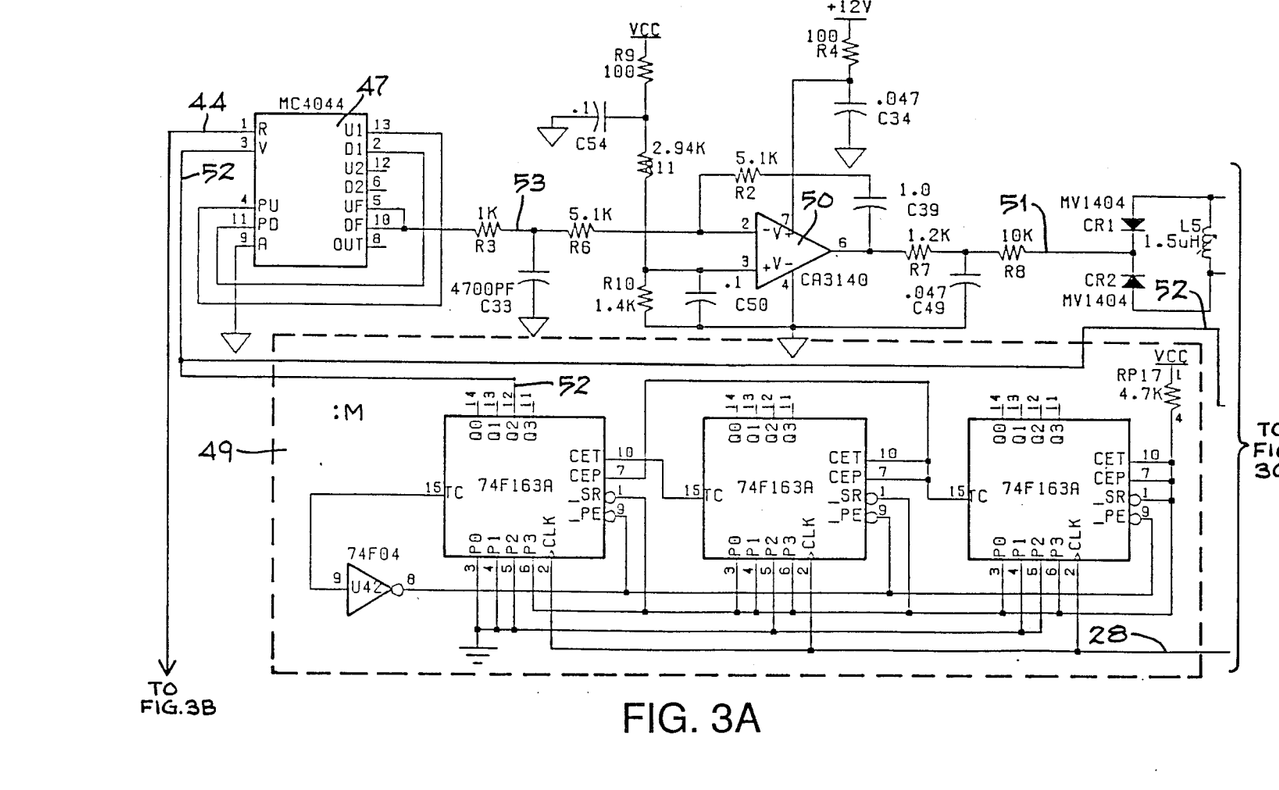
FIGS. 3A to 3C are consecutive portions of a detailed schematic circuit diagram depicting the playback synchronizing generator of FIG. 1.
Figure 3B:
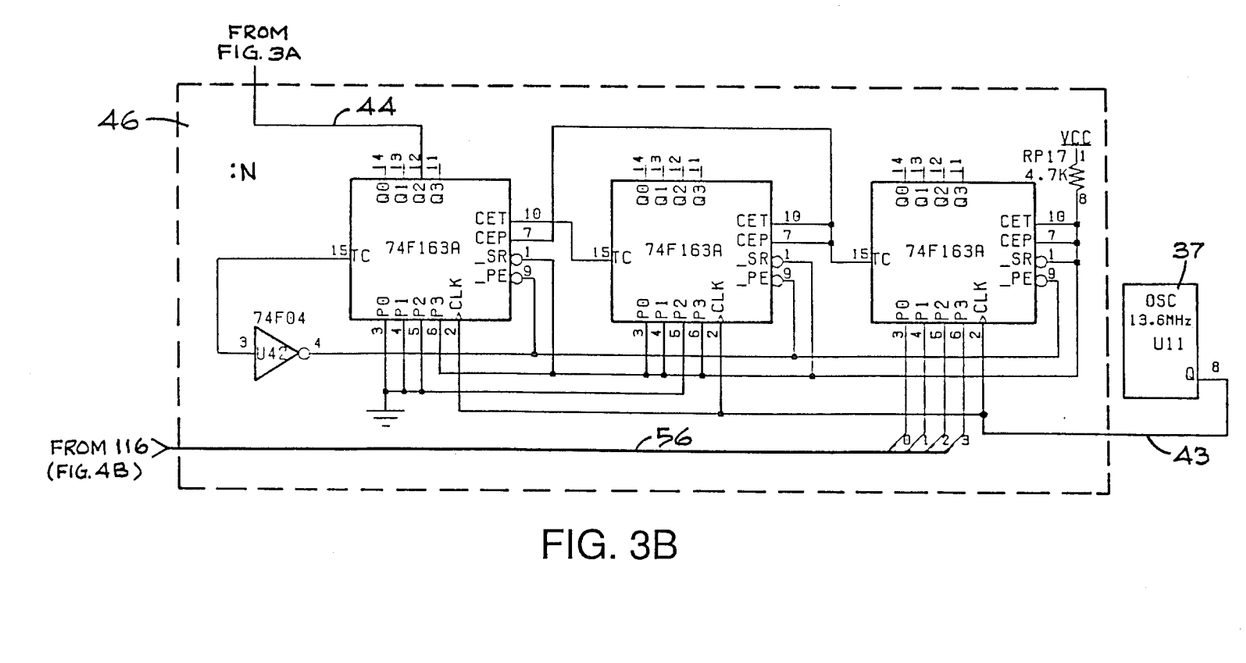
Figure 3C:
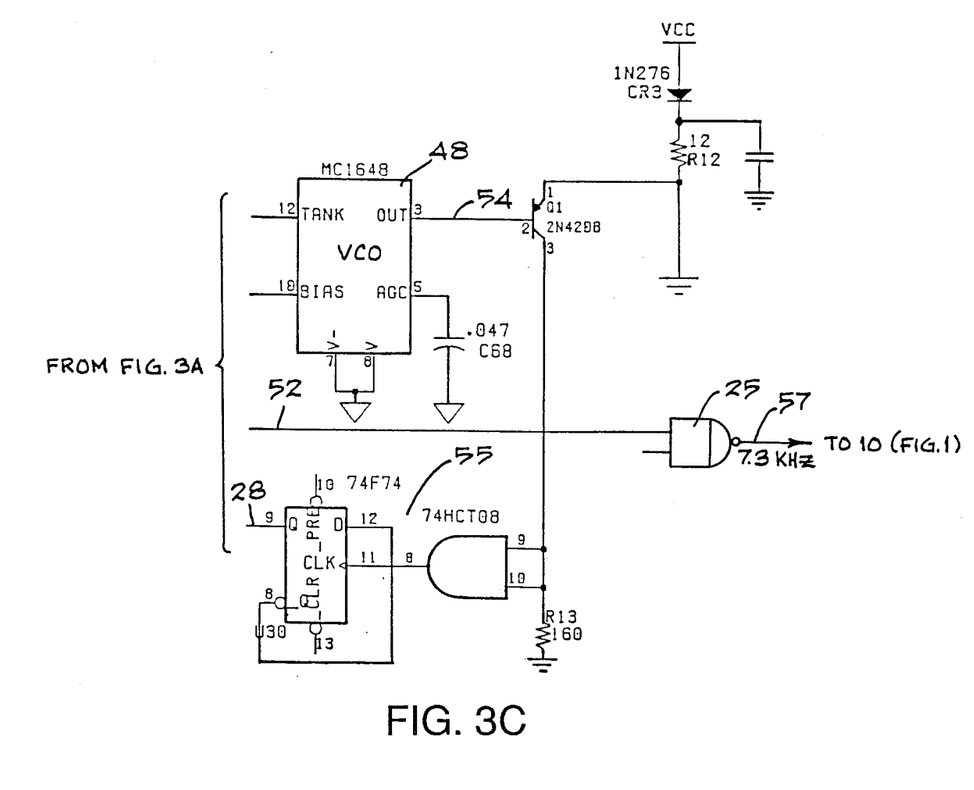

FIGS. 3A to 3C show a detailed circuit diagram corresponding to the previously described phase locked loop of FIG. 2. As it is seen from these Figures, the frequency dividers 46, 49, are preferably implemented by three 4-bit counters each.

Figure 4A:
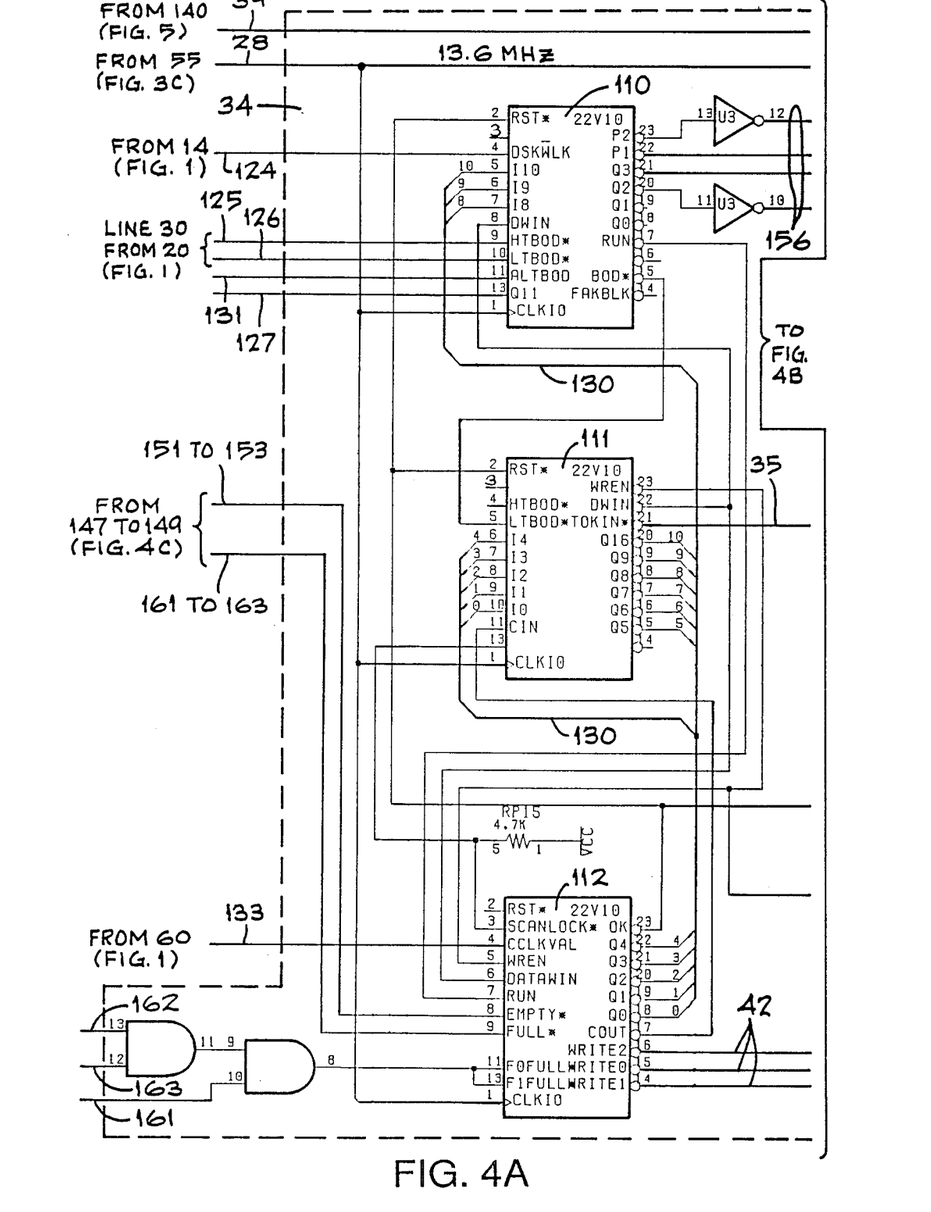
FIGS. 4A to 4C are consecutive portions of a detailed schematic circuit diagram corresponding to the write control and data output memory circuits of FIG. 1.
Figure 4B:
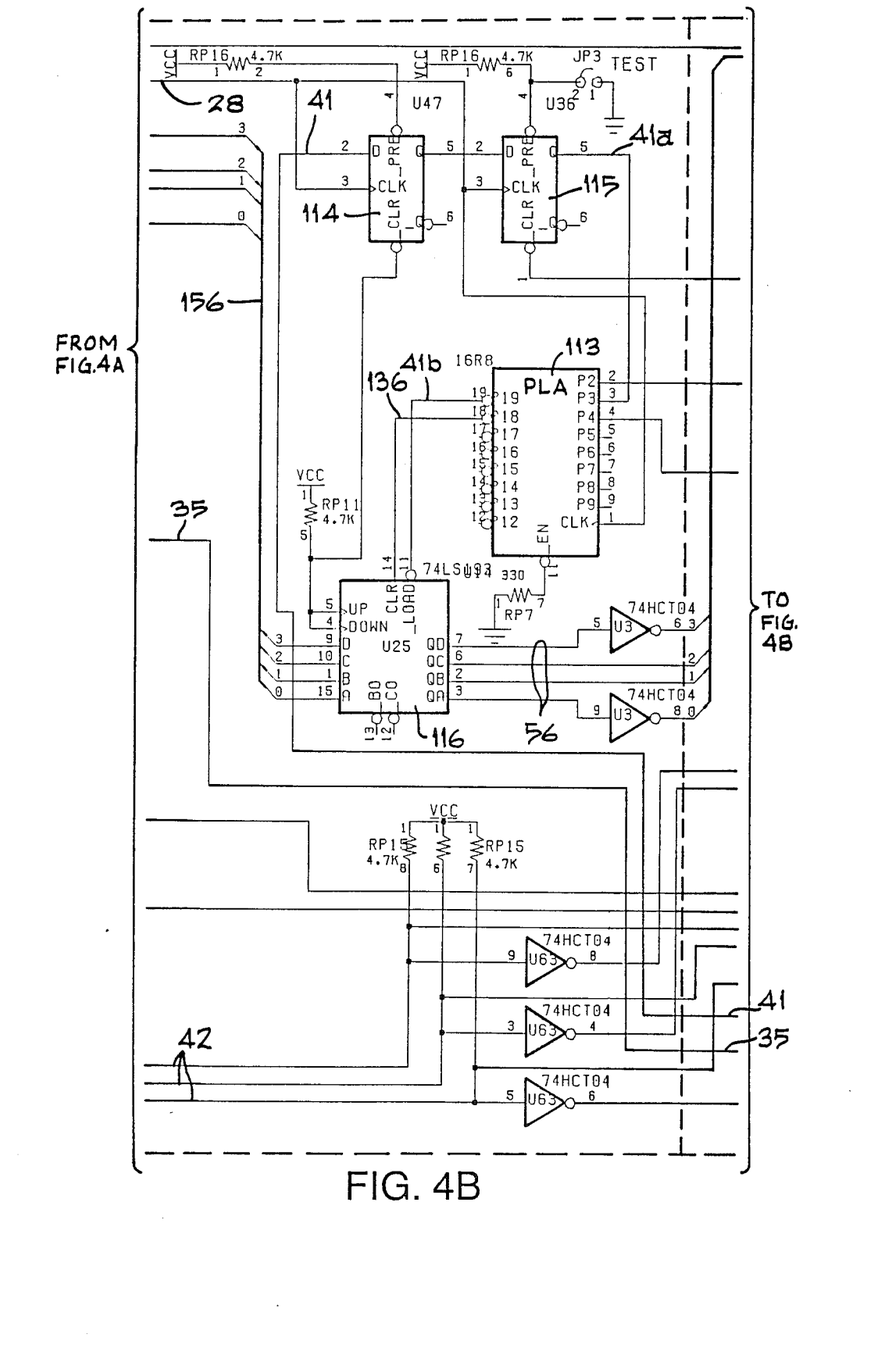

FIGS. 4A and 4B show the write control circuit 34, which in the preferred embodiment is implemented by programmable array logic (PLA) circuits 110 to 113, D-type flip-flops 114, 115, and up/down counter 116. PLA circuits 110 to 112 are interconnected with each other and operate as a single unit, as it will be described below. The PLA circuits receive on line 124 from the TBC circuit 14 of FIG. 1 a signal indicating that the TBC circuit is in locked condition and thus it supplies valid data. That signal is clocked into PLA's at a data byte transfer clock frequency equal to 13.6 MHz. During start-up, PLA circuits 110 to 112 receive on line 133 a control signal from the microprocessor 60 of FIG. 1, indicating that the frequency synthesizer 64 shown in FIG. 1 has been programmed via line 62 to a desired output clock frequency on line 59.

On line 125 a high threshold (HT) BOD marker, and on line 126 a low threshold (LT) BOD marker are applied to the PLA circuits 110 to 112 from the BOD correlator 20 of FIG. 1, where lines 125, 126 correspond to line 30 of FIG. 1. In the preferred embodiment during start-up of the playback operation, that is for example when the write control circuit is reset via line 119, shown in FIG. 4C, it is necessary that a BOD marker which has no errors therein is first detected by the correlator 20. For that purpose the correlator utilizes a so called high threshold for the correlation, which does not allow for any bit errors, to assure that the beginning of the data block has been accurately detected. However once a high threshold BOD marker has been found, the correlator 20 utilizes thereafter a low threshold which allows for some bit errors in the BOD marker, so that data blocks will not be missed during normal operation when errors in the marker may occur. In case error correction is not utilized, there is a possibility that the BOD marker may be not found due to a high number of bit errors, even when the low threshold is utilized. To prevent the memory from becoming empty, the PLA circuits 110 to 112 are programmed to predict occurrence of a BOD marker as follows. An outside counter (not shown), connected via line 127 counts a predetermined number of clock cycles. In the preferred embodiment it counts to a terminal count selected greater than 6000. The counter is normally reset at the occurrence of the BOD marker. When the BOD marker does not occur during that count, the terminal count is applied as an alternate (ALT) BOD marker on line 131 and applied to the PLA circuits.

Figure 4C:
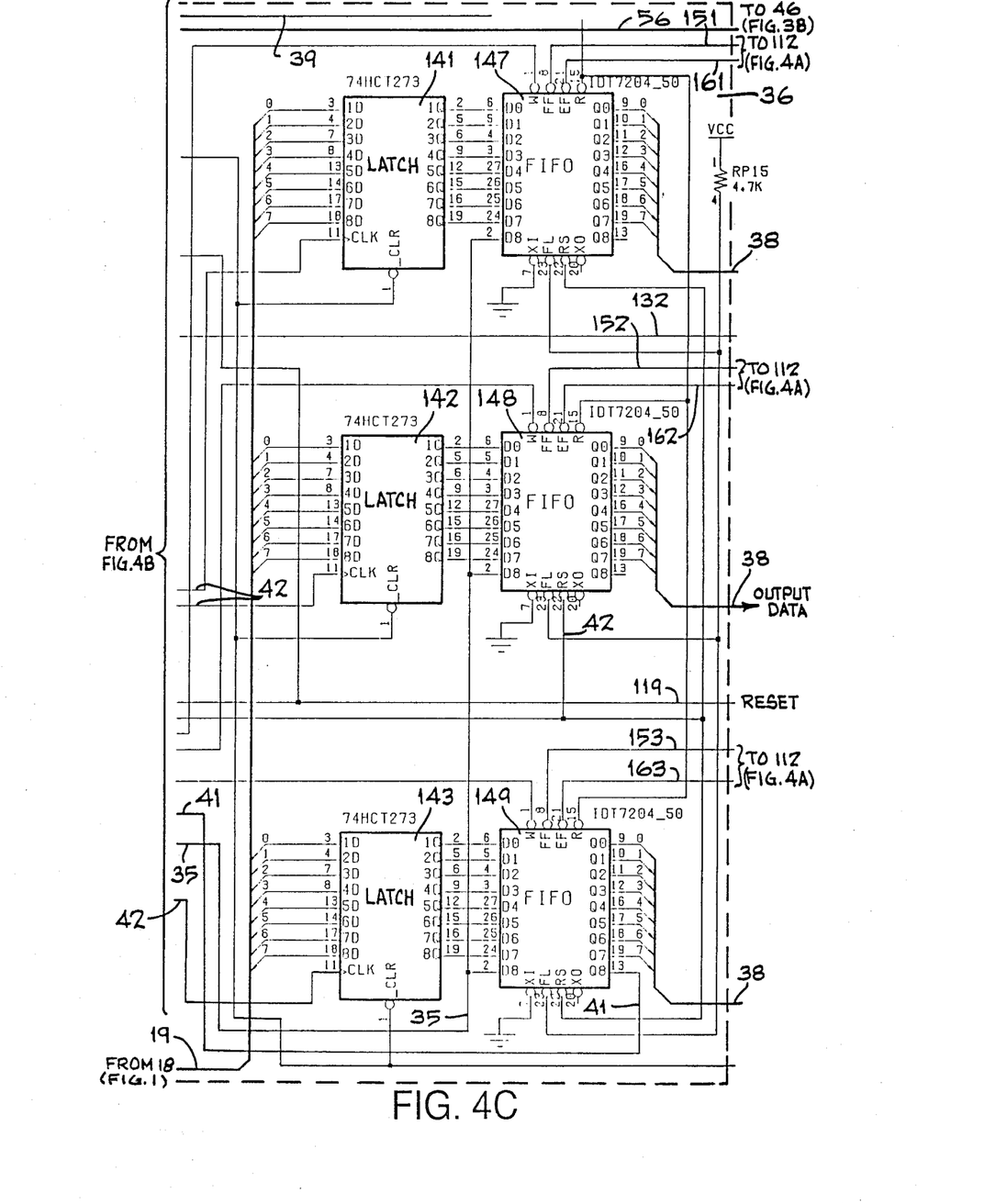

Upon receiving a control signal on one of the lines 125, 126 or 127, indicating beginning of a data block, the PLA circuits 110 to 112 start to count the number of data bytes entering the FIFO memory 36 on line 19, as it is shown in FIG. 4C. Simultaneously, the PLA circuits provide the previously described write clocks on line 42 to the FIFO memory 36 of FIG. 4C, thereby enabling to store consecutive data blocks in the memory. Line 130 is an internal connection between the PLA's 110 to 112 carrying the byte count. At a count corresponding to one half of the data block, that is at 3000, the previously described MOD marker is written into the memory 36 via line 35 as the ninth bit attached to the byte occurring in the middle of the data block, that is at the 3000 count. When that MOD marker is read out from the memory 36 on line 41, it is delayed by the flip-flops 114, 115, shown in FIG. 4B, and thereafter applied to PLA 113 via line 41a. In response to the signal on line 41a, PLA 113 applies a load control signal on line 41b to up/down counter 116, which counter in turn loads the count provided by PLA 110 on line 156. That count corresponds to the amount of time measured in internal system clock cycles, between the occurrence of the BOD signal on line 30 and MOD signal on line 41. Depending on the magnitude and direction of the difference, the direction being determined from the sequence in which these signals occurred, the counter 116 applies a count, corresponding to the error correction signal on line 56, to the frequency divider 46 of FIG. 3B, which in turn changes the division ratio N of the divider by +1, +2, −1 or −2 as it has been previously described. The count is applied synchronously with the occurrence of the MOD marker and it is cleared via line 136 from PLA 113. PLA 113 is programmed to apply the clear signal after a fixed number of clock cycles. The foregoing adjustment of the divisor N corresponds to a 0.05 percent or 0.1 percent frequency adjustment of the clock signal on line 28. When the counter 116 is cleared, the error correction signal on line 56 returns to its nominal value. By the foregoing, the adjustment of the divisor N is limited to be within the previously described integer values of 1861 to 1865, thereby preventing the scanner from accelerating or decelerating for a longer period of time than necessary to prevent overshoot or undershoot.

With further reference to FIG. 4C, it shows the playback data output memory circuit 36, comprising respective data latches 141 to 143 coupled to respective FIFO memories 147 to 149. The data block in the form of parallel data bytes is received on line 19 from the error correction circuit 18 of FIG. 1. The data is applied to the data latches 141 to 143, at write clock rates applied on line 42 by the PLA circuits 110 to 112 of FIG. 4A. In response to the write clock on line 42 the data from each latch 141 to 143 is written into a respective FIFO memory 147 to 149. The data from these FIFO memories is read out on lines 38 at a rate determined by the previously described read clock signal on line 39. Each respective FIFO memory 147 to 149 indicates on one of the lines 151 to 153 when it becomes full, and on one of the lines 161 to 163 when it becomes empty. When any of the signals on lines 151 t 153, or 161 to 163 occurs, indicating memory overflow or underflow, it is applied to the PLA circuits 110 to 112, which in turn initiate a new start-up process.

Figure 5:
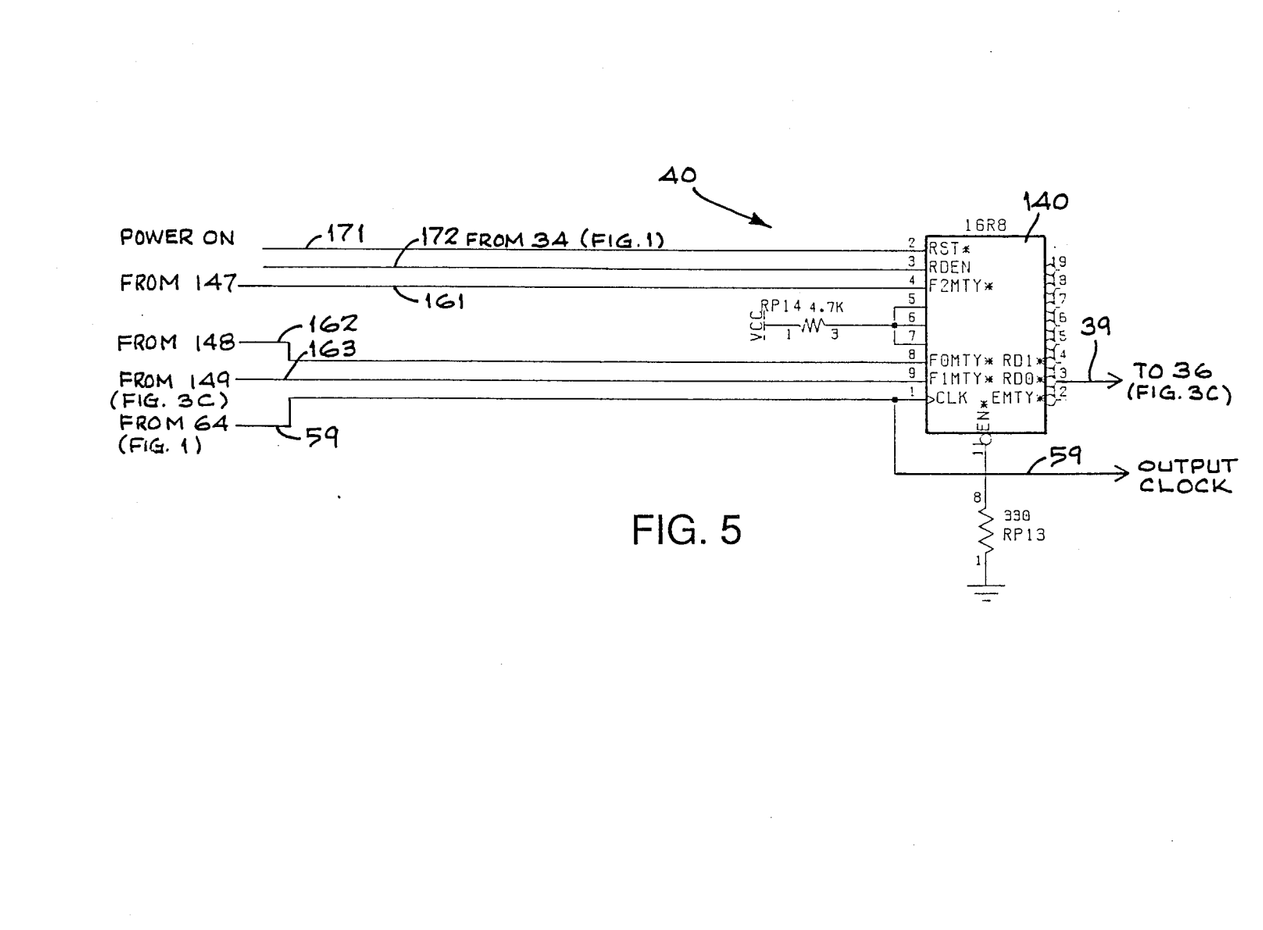
FIG. 5 is a detailed schematic circuit diagram showing the read control circuit of FIG. 1.

Now the operation of the read control circuit 40 of FIG. 1 will be described in more detail with reference to FIG. 5. In the preferred embodiment shown in FIG. 5 the read control circuit comprises a programmable logic array (PLA) 140, which receives on line 171 a power on reset signal from a conventional power control circuit (not shown). During start-up operation, the PLA 140 receives on line 172 the previously described control signal which enables reading of the output data from memory circuit 36 of FIG. 4C by applying the previously described read signals on line 39 from the read controller 140. The previously described accurate output clock signals provided by the frequency synthesizer 64 of FIG. 1 are applied on line 59 to PLA circuit 140. The PLA circuit 140 is programmed to apply, in response to the signal on line 59, accurately timed read clocks on line 39 to the respective FIFO's 147 to 149 of FIG. 4C. In response to these read clock signals the output data from the respective FIFO's is read out in the proper sequence on line 38.

It will be apparent to those skilled in the art that numerous modifications can be made to the embodiment described herein without departing from the scope of the invention. All such modifications are intended to be included within the scope of the claims appended hereto.

What is claimed is:

1. Apparatus for playback of data received at a variable input rate and recorded on a longitudinal recording medium, utilizing a playback transducer mounted on a rotating scanner drum, said input data rate being maintained constant during a particular recording operation, said data being recorded in the form of fixed length data blocks having variable spacing between said blocks, corresponding to said variable rate, a data block marker being recorded at the beginning of each block, and wherein said input data rate is encoded and recorded on said medium, comprising:

playback synchronizing generator means for providing an internal data transfer clock having a nominal rate, and deriving therefrom synchronously a signal for controlling a rate of rotation of said scanner drum during playback;

data output clock generator means for providing an adjustable, stable data output clock;

data output clock rate control means for receiving and decoding said played back input data rate, and providing responsively a first control signal applied to said data output clock generator means to adjust a rate of said data output clock to correspond to said input data rate;

correlator means for receiving said playback data and detecting said data block marker, and providing responsively a second, beginning of data block control signal;

memory means for receiving and storing said playback data at said internal data transfer clock rate, said stored data being read therefrom sequentially at said data output clock rate, said memory means providing a third, memory status control signal corresponding to a predetermined level of fullness thereof, said third control signal being provided to coincide with said second control signal pertaining to a next sequential data block when an average amount of data being written into said memory is equal to an average amount of data being read from the memory; and memory write control means receiving said second and third control signals, enabling input of a data block into said memory means in response to said second control signal, and detecting a difference in time between the occurrences of said second and third control signals, and applying responsively an error signal to said playback synchronizing signal generator means to adjust said internal data transfer clock rate to compensate for said time difference.

2. The apparatus of claim 1, wherein said memory write control means is coupled to count said data written into said memory means in response to said beginning of data block control signal, and to write a memory status marker into said memory means at a data location corresponding to said predetermined level of fullness when said memory status marker is being read from said memory means.

3. The apparatus of claim 2, wherein said memory status marker is written into said memory means when said count provided by said memory write control means corresponds to one half of said data block being written into said memory means.

4. The apparatus of claim 1, wherein said memory means is of a sequential type where said data is read therefrom in the same order in which it has been written therein.

5. The apparatus of claim 1, wherein said data output clock generator means comprises a frequency synthesizer means.

6. The apparatus of claim 5 wherein said data output clock rate control means comprises microprocessor means programmed to apply said first control signal to adjust said data output clock rate provided by said frequency synthesizer means to correspond to said decoded input data rate.

7. The apparatus of claim 1 wherein said playback synchronizing generator means comprises a phase locked loop with adjustable frequency divider means having a predetermined frequency dividing ratio for providing said internal data transfer clock having said nominal rate, and wherein said error signal provided by said memory write control means is coupled to adjust said dividing ratio.

8. The apparatus of claim 1, wherein said memory write control means comprises a programmable logic array means.

9. Apparatus for playback of data received at a variable input data rate and recorded on a magnetic tape, utilizing a playback transducer mounted on a rotating scanner drum, said input data rate being maintained constant during a particular recording operation, said data being recorded in the form of fixed length data blocks having variable length spacing between said blocks, corresponding to said variable data rate, a data block marker being recorded at the beginning of each data block, and wherein said input data rate is encoded and recorded on said tape, comprising:

playback synchronizing generator means comprising a phase locked loop with adjustable frequency divider means having a predetermined frequency dividing ratio, for providing an internal data transfer clock having a nominal rate, and for deriving therefrom synchronously a signal for controlling a rate of rotation of said scanner drum during playback;

data output clock generator means for providing an adjustable, stable data output clock;

data output clock rate control means for receiving and decoding said played back input data rate, and providing responsively a first control signal applied to said data output clock generator means to adjust the rate of said data output clock to correspond to said input data rate;

correlator means for receiving said playback data and detecting said data block marker, and providing responsively a second control signal indicating beginning of a data block;

first-in, first-out type memory means for receiving and storing said playback data sequentially at said internal data transfer clock rate, said stored data being read from said memory means at the data output clock rate, said memory means providing a third control signal corresponding to a predetermined level of fullness thereof, said third control signal being provided to coincide with said second control signal pertaining to a next sequential data block when an average amount of data being written into the memory is equal to an average amount of data being read from the memory; and memory write control means receiving said second and third control signals, enabling input of a data block into said memory means in response to said second control signal, and detecting a difference in time between the occurrences of said second and third control signals, and applying responsively an error signal to said playback synchronizing signal generator means to adjust said frequency dividing ratio to compensate for said time difference.

* * * * *